United States Patent
Gupta et al.

(10) Patent No.: US 11,657,649 B2
(45) Date of Patent: May 23, 2023

(54) CLASSIFICATION OF SUBJECTS WITHIN A DIGITAL IMAGE

(71) Applicant: Adobe Inc., San Jose, CA (US)

(72) Inventors: Sourabh Gupta, Noida (IN); Saurabh Gupta, Noida (IN); Ajay Bedi, Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/575,469

(22) Filed: Jan. 13, 2022

(65) Prior Publication Data

US 2022/0139108 A1 May 5, 2022

Related U.S. Application Data

(63) Continuation of application No. 16/664,754, filed on Oct. 25, 2019, now Pat. No. 11,256,907.

(51) Int. Cl.
*G06V 40/16* (2022.01)
*G06T 7/246* (2017.01)

(52) U.S. Cl.
CPC ............ *G06V 40/172* (2022.01); *G06T 7/246* (2017.01); *G06V 40/171* (2022.01); *G06V 40/176* (2022.01)

(58) Field of Classification Search
CPC .. G06V 40/172; G06V 40/171; G06V 40/176; G06T 7/246
See application file for complete search history.

(56) References Cited

U.S. PATENT DOCUMENTS

| | | | | |
|---|---|---|---|---|
| 8,401,248 | B1* | 3/2013 | Moon | G06V 40/18 382/103 |
| 8,879,787 | B2* | 11/2014 | Ikenoue | G06T 7/251 382/103 |
| 9,666,088 | B2* | 5/2017 | Dalal | G09B 5/02 |
| 9,792,491 | B1* | 10/2017 | Ramaswamy | G06V 40/10 |
| 2010/0086215 | A1* | 4/2010 | Bartlett | G06V 40/171 382/224 |
| 2021/0110015 | A1* | 4/2021 | McCarty | G06F 21/32 |

(Continued)

OTHER PUBLICATIONS

Google, "Face Match on Google Nest Hub Max", Google Nest Help, https://support.google.com/googlenest/answer/9320885?hl=en, 3 pages, 2019 accessed Oct. 25, 2019.

(Continued)

*Primary Examiner* — Wesley J Tucker
(74) *Attorney, Agent, or Firm* — Kilpatrick Townsend & Stockton LLP

(57) ABSTRACT

Described herein is a system and techniques for classification of subjects within image information. In some embodiments, a set of subjects may be identified within image data obtained at two different points in time. For each of the subjects in the set of subjects, facial landmark relationships may be assessed at the two different points in time to determine a difference in facial expression. That difference may be compared to a threshold value. Additionally, contours of each of the subjects in the set of subjects may be assessed at the two different points in time to determine a difference in body position. That difference may be compared to a different threshold value. Each of the subjects in the set of subjects may then be classified based on the comparison between the differences and the threshold values.

20 Claims, 9 Drawing Sheets

(56) References Cited

U.S. PATENT DOCUMENTS

2022/0067135 A1* 3/2022 Barth .................... G06V 40/40
2023/0058259 A1* 2/2023 Suneja ................. G06F 18/253

OTHER PUBLICATIONS

Droidlife, "Google Assistant is Almost Ready to Scan Your Face", https://www.droid-life.com/2019/08/28/google-assistant-is-almost-ready-to-scan-your-face/, 5 pages, Aug. 28, 2019, accessed Oct. 25, 2019.
Apple, "Find and Identify Photos of People Using Photos on Mac", https://support.apple.com/guide/photos/view-photos-by-whos-in-them-phtad9d981ab/mac, 3 pages, 2019 accessed Oct. 25, 2019.
Notice of Allowance dated Oct. 15, 2021, U.S. Appl. No. 16/664,754.

* cited by examiner

CLASSIFICATION OF SUBJECTS WITHIN A DIGITAL IMAGE

RELATED APPLICATIONS

The present application is a continuation of U.S. application Ser. No. 16/664,754 entitled "Classification of Subjects Within a Digital Image," filed Oct. 25, 2019, which is incorporated by reference here in its entirety.

TECHNICAL FIELD

This disclosure relates generally to image processing. More specifically, but not by way of limitation, this disclosure relates to classifying subjects in a digital image as being either active or passive subjects.

BACKGROUND

In conventional image processing applications that utilize face detection, images are often processed (e.g., grouped) according to the people identified as being within the image (known as active subjects). Frequently, however, an image may be captured that includes objects, or artificial persons, in the background having facial data. These objects having facial data are referred to as passive subjects. During image processing, users often group images based on the active subjects included within the image. This can be problematic if the image also includes a number of passive subjects that the user must sort through and/or remove.

Embodiments of the invention address these and other problems individually and collectively.

SUMMARY

Embodiments of the disclosure are directed to a system and method capable of detecting facial information belonging to passive (or non-active) subjects within an image in order to provide functionality directed to that facial information in image processing. In this system, facial data associated with non-living subjects (e.g., facial data displayed on a picture, poster, or statue) may be identified based upon a lack of changes in facial expression and/or body contour with respect to time. More particularly, the proposed method involves capturing at least two images at different points in time (e.g., via live capture), detecting a set of potential subjects within the two images, and determining a status for each subject in the set of potential subjects based on changes in the image at the two points in time.

One embodiment of the invention is directed to a computer-implemented method comprising accessing image data from at least a first point in time and a second point in time, the image data comprising information associated with a set of subjects, determining, for each subject in the set of subjects, a respective objective difference value between (a) a first expression or contour of the subject at the first point in time and (b) a second expression or contour of the subject at the second point in time, classifying, within the set of subjects, each subject of the set of subjects having an objective difference value greater than a threshold value as an active subject, and classifying each subject of the set of subjects having an objective difference value not greater than a threshold value as a passive subject.

Another embodiment of the invention is directed to a system comprising a processor; and a memory including instructions that, when executed with the processor, cause the system to, at least: access image data from at least a first point in time and a second point in time, the image data comprising information associated with a set of subjects, determine, for each subject in the set of subjects, a respective objective difference value between (a) a first expression or contour of the subject at the first point in time and (b) a second expression or contour of the subject at the second point in time, classify, within the set of subjects, each subject of the set of subjects having an objective difference value greater than a threshold value as an active subject, and classify each subject of the set of subjects having an objective difference value not greater than a threshold value as a passive subject.

Yet another embodiment of the invention is directed to a non-transitory computer readable medium storing specific computer-executable instructions that, when executed by a processor, cause a computer system to at least access image data from at least a first point in time and a second point in time, the image data comprising information associated with a set of subjects, determine, for each subject in the set of subjects, a respective objective difference value between (a) a first expression or contour of the subject at the first point in time and (b) a second expression or contour of the subject at the second point in time, and classify each subject of the set of subjects having an objective difference value not greater than a threshold value as a passive subject.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Various embodiments in accordance with the present disclosure will be described with reference to the drawings, in which.

DETAILED DESCRIPTION

Figure 1:
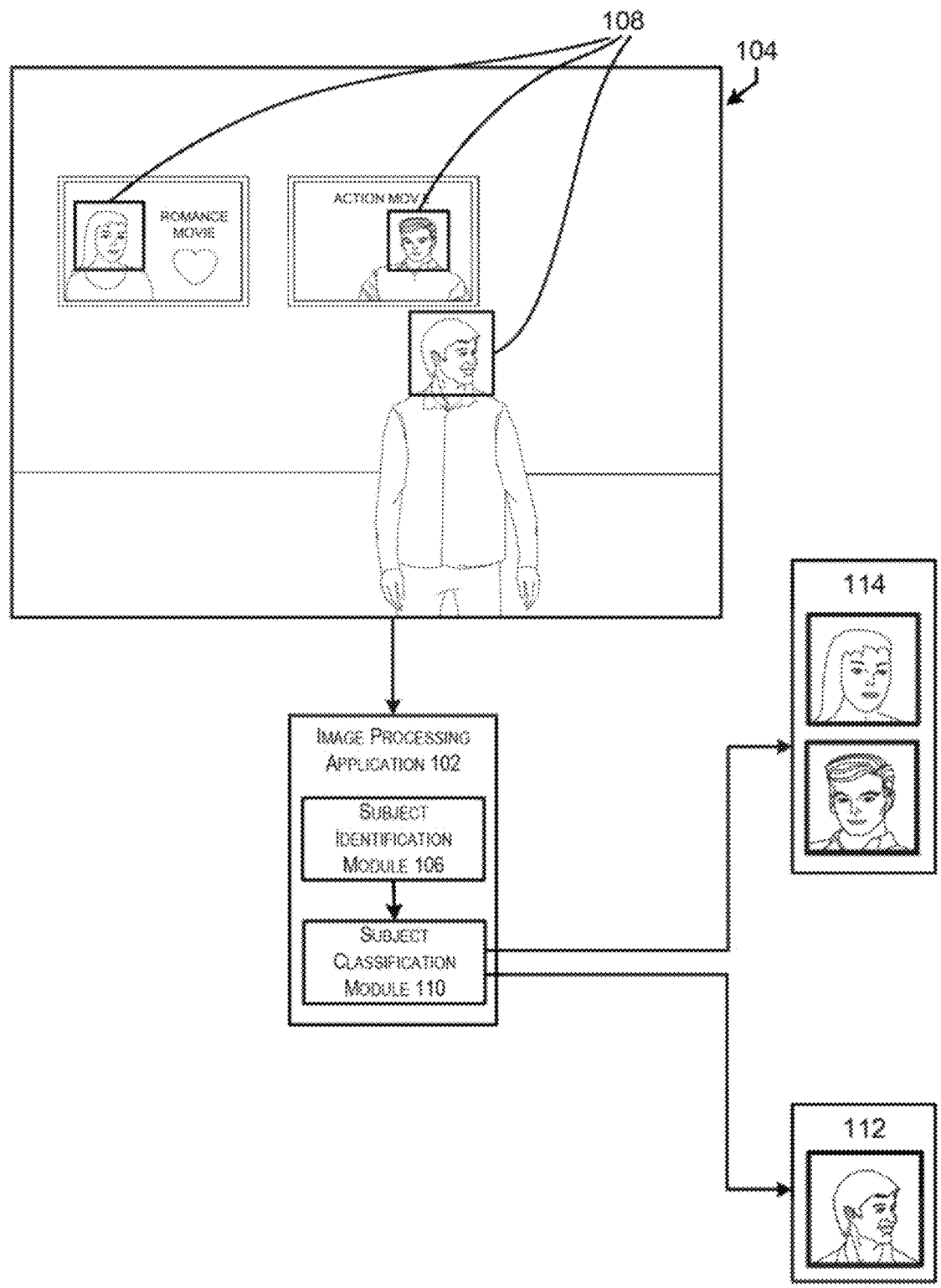
FIG. 1 depicts an illustrative overview of a system capable of classifying subjects detected within an image.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As described above, captured images (e.g., photographs) frequently include a number of passive subjects in addition to any included active subjects. These passive subjects are usually not the intended target of the user that captures the image. However, identification of passive subjects within an image often requires subjective analysis of the image, which a conventional computing system is not capable of performing. Accordingly, if images are captured that include passive subjects, conventional image processing applications are typically unable to distinguish between active and passive subjects within the image. Those image processing applications may incorrectly identify facial data captured from a passive subject as belonging to an active subject, which can cause problems when processing that image. In some cases, a user of an image processing application may be required to identify active (or passive) subjects within an image because the image processing application is unable to do so. To do this, a user would have to subjectively identify each active (or passive) subject by mentally processing visual cues and contextual clues within the image.

Techniques described herein include a system and method for detecting facial information belonging to passive (or non-active) subjects. The system and techniques described herein addresses the inability of a computing device to classify subjects within an image. For example, a system applies a specific set of rules to each of a set of subjects in image information collected from at least two points in time. Such a system can perform a first process for detecting subjects within an image and to then perform a second process for classifying those subjects. In a process for classifying subjects, facial data associated with non-living subjects (e.g., facial data displayed on a picture, poster, or statue) may be identified based upon changes in facial expression and/or body contour with respect to time. This is described in greater detail below.

As noted above, the system may, during a process for classifying subjects in an image, first detect changes in facial expression for active subjects across the two points in time. This involves detecting locations of facial landmarks for each of the subjects at the first point in time and comparing those locations to locations of facial landmarks for the respective subject at the second point in time. The system determines whether the relationship between the locations of those facial landmarks has changed (note that a simple "shift" in the position of the facial landmarks for a particular subject may be insufficient to show a change in expression). If some change is detected in the relationship between the locations of the facial landmarks, then the system next determines whether an objective value associated with that change is greater than some threshold value (i.e., in order to prevent false positives caused by fluctuations in facial landmark detection and/or movement of the capture device). If the objective value associated with the change is greater than the threshold value, the subject associated with that facial information is determined to be an active subject.

The system further processes the image by detecting changes in a contour for each subject. This may involve identifying a contour, or outline, to be associated with each subject in the image. Boundary boxes are created for each subject in the set of subjects to be processed in this manner. These boundary boxes are extended until they encounter other facial data or an image boundary. The contour associated with the subject is identified within the boundary box using a machine learning model. Similar to the process above, a contour for each non-active subject in the set of potential subjects at the first point in time is compared to a contour for each respective non-active subject at the second point in time. If a change in contour over a predetermined threshold is detected for a particular subject, then that subject is determined to be an active subject. Once these two processes have been completed, any potential subjects that have not been identified as being active subjects are determined to be passive subjects. Note that while it is envisioned that a system may perform this process even for subjects that are determined to be active subjects based on changes in facial expression as described above, doing so may result in extraneous processing. Hence, identification of active subjects based on changes in contour as described may be performed on a subset of the subjects in the image that have not been identified as being active subjects based on changes in facial expression.

The processes described above can be performed either during a capture event in which the image is obtained using a camera device or during a post processing event. During a capture event, the camera device may perform a "live capture" in which the camera device captures a sequence of images over some period of time. In this scenario, two images may be selected for processing from different points in time during the live capture event. In the post processing event scenario, an image processing application may identify (e.g., using grouping techniques) two images taken at different times that each involve the set of subjects at issue (or a close variation of the set of subjects).

The described embodiments provide a number of advantages over conventional systems. For example, as described elsewhere, the system and techniques enable computing systems to classify subjects as being either active subjects or passive subjects, which computing devices are not conventionally able to do (because of the subjective analysis typically needed to make such a classification). Accordingly, at a minimum, implementation of the described system improves the underlying computing device in that it is made capable of performing functionality that it would not otherwise be capable of performing.

Additionally, by providing for automatic classification of subjects in an image, implementation of the described embodiments also enable automatic processing of subjects in an image based on those classifications. For example, typical image processing (e.g., grouping of images) would require that the user provide input regarding the classification of the subjects in the image before any image processing can occur. This causes delay in the image processing as well as being a burden to the user. In contrast, a system that has implemented the embodiments described herein may automatically classify subjects within the image and then automatically process the images according to the subject classifications without any input from a user.

Illustrative examples and additional details of the above mentioned operations are described in greater detail with reference to the following figures and their accompanying description.

FIG. 1 depicts an illustrative overview of a system capable of classifying subjects detected within an image. In the system of FIG. 1, an image processing application 102 may receive image information 104 from an image capture device (e.g., a camera). The image processing application 102 may use a subject identification module 106 to identify a set of subjects 108 within the received image information 104. Once the set of subjects 108 has been identified, the image processing application 102 may use a subject classification module 110 to classify each of the subjects, such that the set of subjects may be broken up into a set of active subjects 112 and a set of passive subjects 114.

As used herein, an image processing application may be any set of computer-executable instructions that, when executed by a processor, cause a computing device to perform some process with respect to image information. For example, an image processing application may sort images into groupings and/or provide image classification data to a user. As depicted, an image processing application 102, in accordance with embodiments described herein, may include at least functionality attributed to a subject identification module 106 and a subject classification module 110 as described below. The image processing application 102 may be installed upon, and executed from, either a device that is used to capture the image information 104 (e.g., a mobile phone) or a device that is separate from the device used to capture the image information 104 (e.g., a personal computer or a remote server).

As used herein, image information may include any information that may be displayed to produce an image. Image information may be received in any suitable image file format, (e.g., uncompressed, compressed, or vector formats). In some embodiments, the image information 104 may include a series of images obtained during a period of time (e.g., a live photo). Image information may be obtained using any camera device, such as a digital camera included on a mobile phone.

The subject identification module 106 can identify a set of subjects within the received image information 104. Note that one skilled in the art would recognize that a number of techniques are available for identifying subjects within an image. For example, the subject identification module 106 may use facial recognition and/or machine learning to identify the set of subjects within the image information.

The subject classification module 110 can determine, for each subject in the set of subjects 108 received by the subject identification module 106, a classification indicating whether the subject is most likely an active subject or a passive subject. In some cases, this may involve identifying changes in facial expression, changes in subject contour, or both, with respect to time and determining whether an objective value for those changes are greater than some threshold value. This will be described in greater detail below with respect to FIG. 3.

Once each subject in an image has been classified as either an active subject or a passive subject, the image processing application 102 may use those classifications to process images. For example, the image processing application 102 may automatically (e.g., without human interaction) group images according to a set of active subjects included within the image. In some cases, the image processing application 102 may automatically perform facial recognition techniques on any active subjects within an image in order to identify that set of subjects. The image processing application 102 can, for example, automatically apply tags (e.g., metadata) to a set of images that identify the same subject (e.g., an identified active subject) in the set of images, automatically generate and present suggested tags in a user interface for selection by a user, etc. Additionally or alternatively, a set of images with active subjects can be presented, via a user interface, for selection and further editing by the image processing application 102. As the performance of facial recognition techniques can be resource-intensive, the disclosed system may significantly decrease processing resource requirements by preventing facial recognition techniques from being performed on passive subjects.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Figure 2:
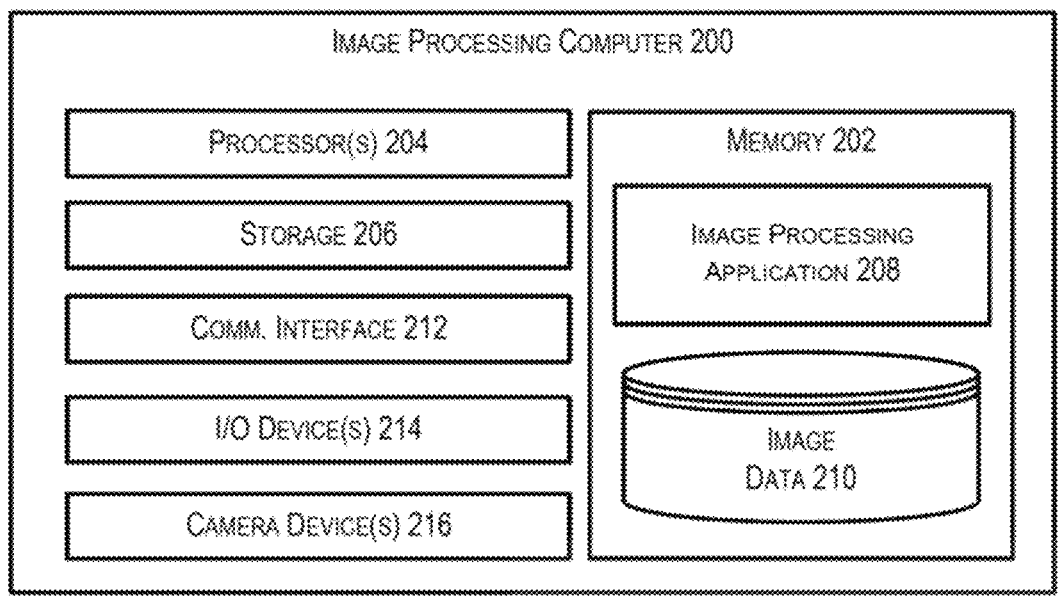
FIG. 2 depicts an illustrative example of a service provider computer that may be configured to perform the techniques described herein.

FIG. 2 depicts an illustrative example of a service provider computer that can perform the techniques described herein. The image processing computer 200 may be any type of computing device such as, but not limited to, a mobile phone, a smart phone, a personal digital assistant (PDA), a laptop computer, a desktop computer, a server computer, a thin-client device, a tablet PC, etc. Additionally, in some embodiments, the depicted service provider computer may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the image processing computer 200 may include at least one memory 202 and one or more processing units (or processors) 204. The processor(s) 204 may be implemented as appropriate in hardware, computer-executable instructions, firmware or combinations thereof. Computer-executable instruction or firmware implementations of the processor(s) 204 may include computer-executable or machine executable instructions written in any suitable programming language to perform the various functions described. The memory 202 may store program instructions that are loadable and executable on the processor(s) 204, as well as data generated during the execution of these programs. Depending on the configuration and type of image processing computer 200, the memory 202 may be volatile (such as random access memory (RAM)), non-volatile (such as read-only memory (ROM), flash memory, etc.), or some combination of the two. The image processing computer 200 may also include additional storage 206, such as either removable storage or non-removable storage including, but not limited to, magnetic storage, optical disks, and/or tape storage.

Turning to the contents of the memory 202 in more detail, the memory 202 may include an image processing application 208 and one or more application programs or services for implementing the features disclosed herein including at least an image processing application 208 that, when executed in conjunction with the processor(s) 204, is configured to identify a set of subjects within received image information and classify those subjects as either active or passive subjects. The image processing application 208 is an example of the image processing application 102 described with respect to FIG. 1 above. As such, the image processing application 208 may include a subject identification module 106 and/or a subject classification module 110 as described. The memory 202 may also include a number of data stores, including image data 210, which maintains image information received for processing as well as subject data (e.g., subject identifications and/or subject classification data).

In accordance with some embodiments, the image processing application 208 comprises code, executable by the processor 204 to perform a process for classifying subjects within an image. For example, the image processing application 208 can perform the process for classifying subjects in an image described in FIG. 3 below.

The image processing computer 200 may also contain communications interface(s) 212 that enable the image processing computer 200 to communicate with a stored database, another computing device or server, one or more remote devices, and/or any other suitable electronic devices. In some embodiments, the communication interface 212 enables the image processing computer 200 to communicate with other electronic devices on a network (e.g., on a private network). The image processing computer 200 may also include input/output (I/O) device(s) and/or ports 214, such as for enabling connection with a keyboard, a mouse, a pen, a voice input device, a touch input device, a display, speakers, a printer, etc. In some embodiments, the image processing computer 200 is in communication with a mobile device or other computing device (e.g., via a network).

Additionally, the image processing computer 200 may include one or more camera devices 216 configured to obtain image information. In some cases, the image processing computer 200 may include multiple camera devices 216, one or more of which may be a depth sensor capable of generating a range image, and one or more of which may be a camera configured to capture image information. A depth sensor may include any device configured to obtain information related to a range or distance between an object (i.e., features on a face) and the depth sensor. The depth sensor can generate a range image or depth map based on received depth information. For the purposes of this application, depth information (e.g., a range map) may be included in image information.

Figure 3:
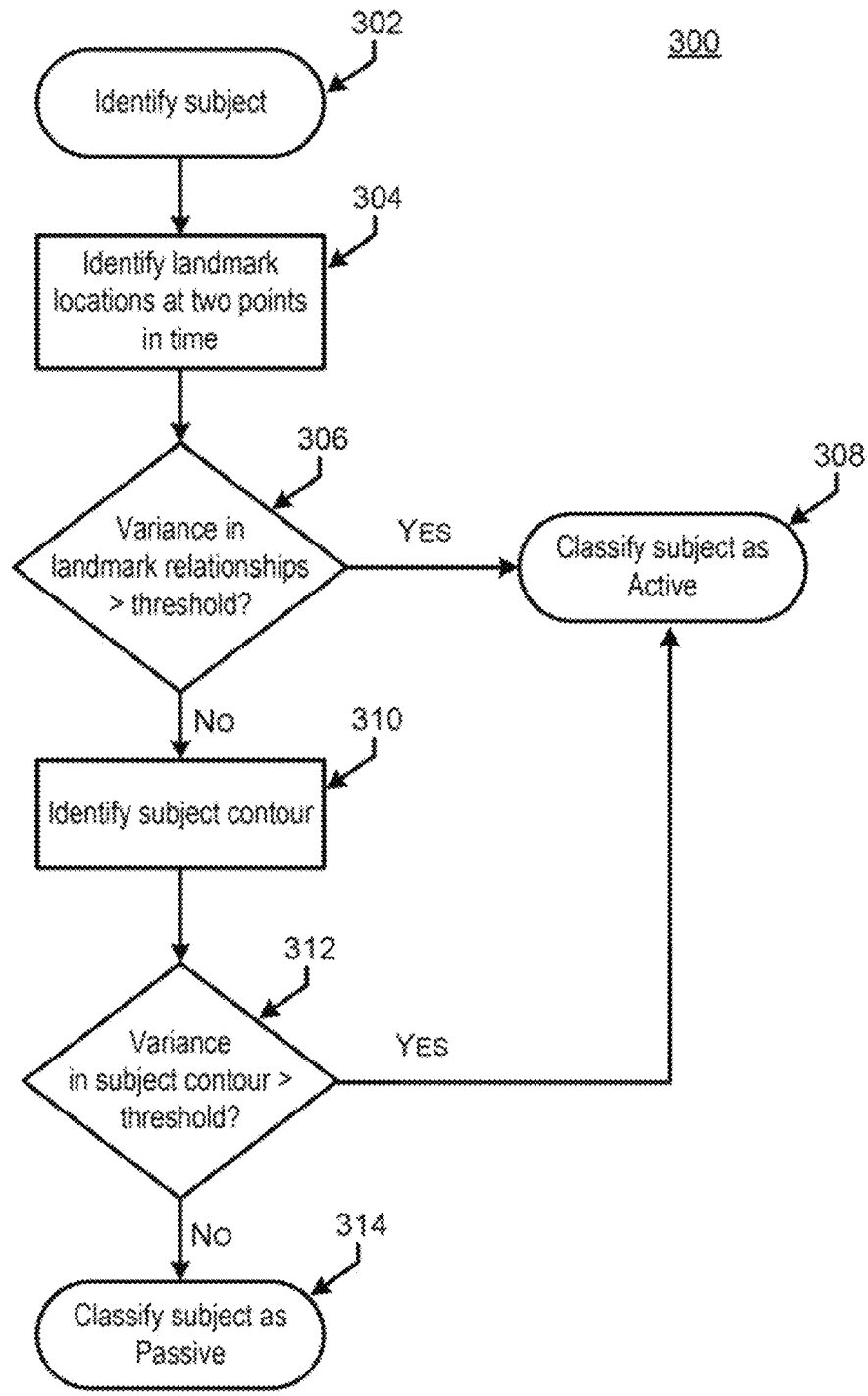
FIG. 3 depicts an illustrative example of a process for classifying subjects in an image in accordance with at least some embodiments.

FIG. 3 depicts an illustrative example of a process for classifying subjects in an image in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the one or more image processing computers 200 shown in FIG. 2. The code may be stored on a computer-readable storage medium, for example, in the form of a computer program including a plurality of instructions executable by one or more processors (e.g., the image processing application 208). The computer-readable storage medium may be non-transitory. As noted elsewhere, the instructions are included within an image processing application 102 as described with respect to FIG. 1 above, which may include a subject identification module (e.g., subject identification module 106 of FIG. 1) and a subject classification module (e.g., subject classification module 110 of FIG. 1).

At block 302, a subject is identified within image information using a subject identification module. In this process, a subject is identified based upon identification of a structure within the image information that resembles facial features (e.g., using computer vision techniques). The facial features in one image of the image information are further compared to facial features in a second image of the image information to identify common subjects within the two images. In this way, a common set of subjects is identified within two separate images of the image information.

At block 304, the process 300 involves identifying locations for a number of facial landmarks for the identified subject within image information associated with two different points in time via a subject classification module. For example, the system may identify the subject within a first image captured at a first point in time as well as within a second image captured at a second point in time. Once the subject has been identified in each of the first and second images, respective sets of facial landmark relationships are determined for the subject within each of the images. The process 300 also involves determining an objective difference value, representing a variance, between the two sets of facial landmark relationships.

At block 306, the process 300 involves comparing the objective difference value for the two sets of facial landmark relationships to a threshold value via a subject classification module. If the objective difference value for the two sets of facial landmark relationships is greater than the threshold value, then the subject associated with the two sets of facial landmark relationships is determined to be an active subject at block 308. In some embodiments, if the objective difference value for the two sets of facial landmark relationships is not greater than the threshold value, then the subject associated with the two sets of facial landmark relationships is determined to be a passive subject. In some embodiments, if the objective difference value for the two sets of facial landmark relationships is not greater than the threshold value, then the process continues to block 310. The process for determining changes in facial expression, as embodied in blocks 304 through 308 of FIG. 3, are described in greater detail below with respect to FIG. 4.

For the purpose of this application, a threshold value is defined as any appropriate value that represents a difference that should be considered significant between two data for a subject. In some cases, a threshold value is dynamically varied based on circumstances under which the image information is collected. For example, the threshold may be raised if image information is captured using a camera that is moving in order to account for a higher degree of inaccuracy. In some embodiments, a threshold value is selected such that it is proportional to an attribute of the image. For example, a threshold value may be selected that is proportional to a size of a subject within the image.

At block 310, the process 300 involves identifying contours for a number of the identified subjects via a subject classification module. To do this, the process 300 involves generating a bounding box for each subject and creating a contour of the subject from image data included within that bounding box. The process for generating subject contour data, as embodied in block 310 of FIG. 3, is described in greater detail below with respect to FIG. 6.

At block 312, the process 300 involves comparing contours for a single subject at the two points in time to determine an objective difference value, or variance, that represents a difference between the two contours via a subject classification module. This determined objective difference value is compared to a threshold value in order to classify the subject as being either active or passive. More particularly, if the objective difference value is greater than the threshold value, then the subject is classified as an active subject at block 308. If, alternatively, the objective difference value is not greater than the threshold value, then the subject is classified as a passive subject at block 314. The threshold value described with respect to block 312 is different from the threshold value described with respect to block 306. The process for using contour data to identify an active (or passive) subject, as embodied in block 312 of FIG. 3, is described in greater detail below with respect to FIG. 7 and FIG. 8 below.

Figure 4:
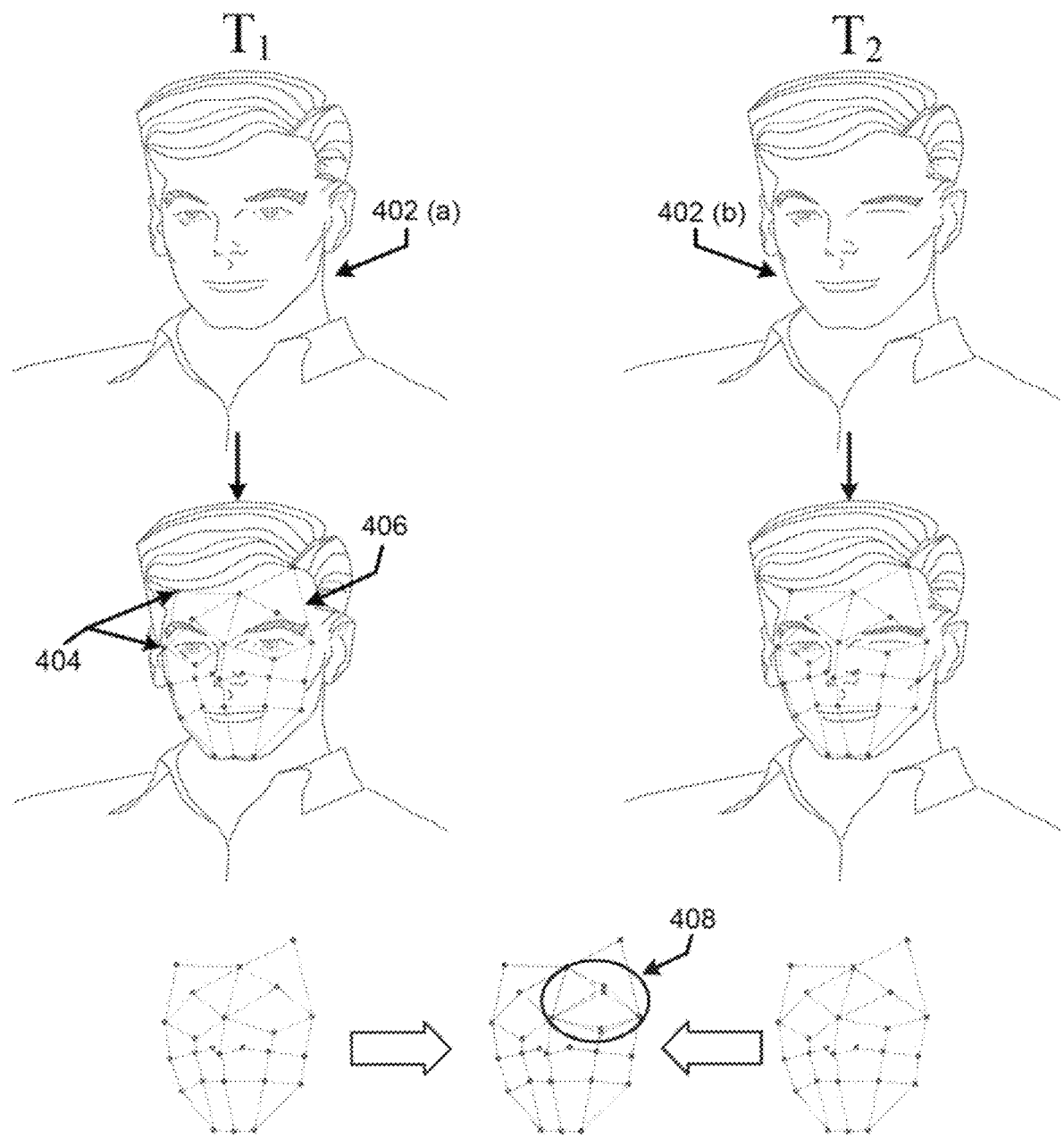
FIG. 4 depicts an illustrative example of determining changes in facial expression that may be used in accordance with embodiments of the disclosure.

FIG. 4 depicts an illustrative example in which changes in facial expression are determined for use in accordance with embodiments of the disclosure. In particular, FIG. 4 depicts image information for a subject 402 at two points in time, such that image information 402 (a) depicts the subject 402 at time $T_1$ whereas image information 402 (b) depicts the same subject 402 at time $T_2$.

In this example, a subject classification module identifies locations within the image for a number of facial landmarks 404 (represented within FIG. 4 as open circles) for each of 402 (a) and 402 (b). This may be done using one or more machine learning techniques in which a training model has been trained on placement of landmarks within facial image data. Locations of one or more landmarks 404 may vary for the same subject at different points in time based on the landmark location technique used. For the purposes of this application, a "location" of a landmark 404 may be an indication of coordinates (or a pixel) associated with the landmark 404 within the image information. The landmark 404 may be placed based on identified facial features/structures within the image. For example, a specific landmark 404 may be placed at the tip of a subject's nose.

The subject classification module can measure distances 406, or vectors (which include direction and distance), between various landmarks 404 (represented within FIG. 4 as dotted lines connecting landmarks). These distance measurements may be compared to other distance measurements in order to identify relationships between the landmarks 404. For example, a distance measurement from landmark A to landmark B (AB) may be compared to a distance measurement from landmark B to landmark C (BC) in order to determine that AB is proportionally 0.67 times BC. This proportion information may be stored in relation to the subject 404. By determining relative locations of landmarks in this fashion, the process used for determining changes in expression in FIG. 4 can be made agnostic toward a location or pose of the subject with respect to a camera that captures the image information. For example, whether the subject is close to, or far from, a camera will not matter as the relative locations of specific landmarks should be consistent. Additionally, a tilt or pose of the subject's face will also not matter for the same reasons.

In some embodiments, subject classification module can compare the determined relationships (e.g., relative distances between landmarks) for the subject as a whole at time $T_1$ to the determined relationships for the subject as a whole at time $T_2$ to determine whether there has been any change in relative position (such as that depicted at 408) between landmarks 404 for the subject between times $T_1$ and $T_2$. It should be noted that there may be small variances in determined relationships that stem from inconsistencies in landmark location placement. Accordingly, an objective value for the change in relative position between landmarks may be determined (e.g., a change in relative proportions). For example, the subject classification module may determine a percentage to which the relative positions of landmark data match. That objective value may be compared to some threshold value to ensure that the change in relative position of the landmark locations represents a change in facial expression for the user. If the subject classification module determines that an objective value for the change in relative position of landmark locations for a subject 402 at times $T_1$ and $T_2$ is greater than the threshold value, the subject classification module can classify the subject 402 as an active subject. In some cases, the subject classification module may instead classify the subject 402 as a passive subject if the subject classification module determines that an objective value for the change in relative position of landmark locations for a subject 402 at times $T_1$ and $T_2$ is not greater than the threshold value.

Figure 5:
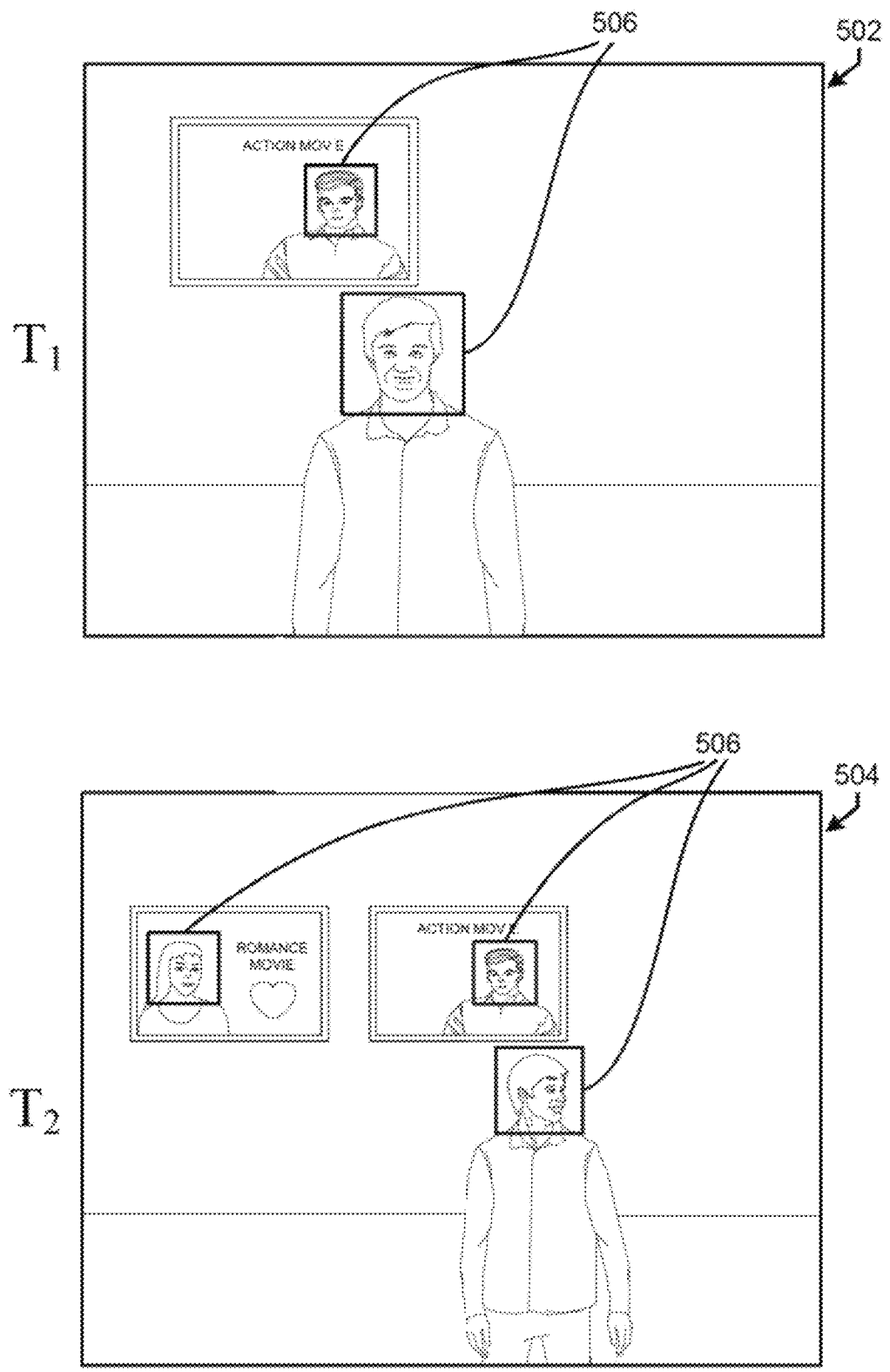
FIG. 5 depicts exemplary image information containing image data collected at two points in time in accordance with embodiments of the disclosure.

FIG. 5 depicts exemplary image information containing image data collected at two points in time in accordance with embodiments of the disclosure. More particularly, FIG. 5 depicts first image data 502 and second image data 504 that both depict the same set of subjects 506. First image data 502 may pertain to an image collected at time $T_1$ whereas second image data 504 may pertain to an image collected at time $T_2$.

Although time $T_1$ differs from time $T_2$, so that image data 502 collected at time $T_1$ differs from image data 504 collected at time $T_2$, time $T_1$ may occur before or after time $T_2$. The difference in time between time $T_1$ and time $T_2$ may be of any length, ranging from mere milliseconds to days, or even years. In some embodiments, image data 502 may be captured within the same image information as image data 504. For example, a camera device may capture a series of images in a "live capture" event that spans some period of time (e.g., 3 seconds). In this example, image data 502 may be an image from one point in the period of time and image data 504 may be an image from a different point in the period of time. In some embodiments, image data 502 may be identified as being within the same user portfolio as image data 504. For example, the user may upload a number of photos to an image processing application. In this example, the image processing application may determine that the set of subjects 506 in image data 502 matches the set of subjects 506 in the image data 504 and may select the two images to be used in classifying the subjects. Since the objective is to classify the subjects in the image, the background of the image may or may not need to match. In some cases, location data for the image data 502 may be compared to location data for a number of images stored in relation to one or more users to select images taken in the vicinity of the location in which image data 502 was taken. In these cases, the system may determine if any of the number of images includes at least a subset of the set of subjects 506 and may classify the subjects in the subset using image data 502 in the determined image.

Figure 6:
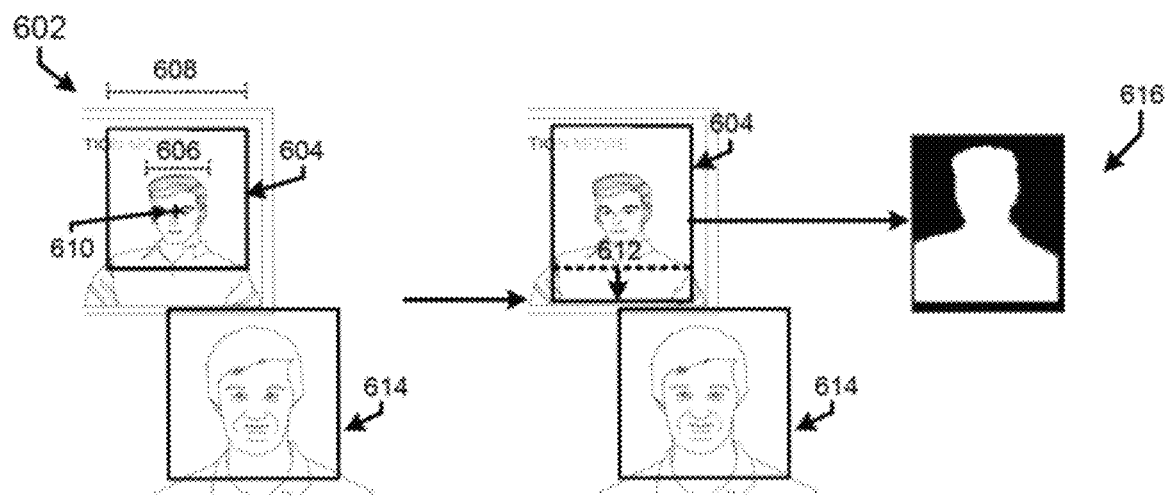
FIG. 6 depicts an illustrative example of generating subject contour data that may be used in accordance with embodiments of the disclosure.

FIG. 6 depicts an illustrative example of generating subject contour data that may be used in accordance with embodiments of the disclosure. Generating subject contour data may involve generating a bounding box, resizing that bounding box, and identifying the imagery within the bounding box that belongs to the subject.

In this example, a subject identification module can generate an initial bounding box for each subject. To do create a bounding box 604, the subject classification module may first determine a width or height of the facial data associated with the subject. A bounding box 604 may be generated with a width or height that is proportional to the width or height. For example the bounding box 604 may be generated such that the width 606 of the facial data takes up ⅓ of the width of the width 608 of the bounding box 604. The generated bounding box 604 may be positioned so that a center 610 of the bounding box 604 is aligned with a center of the facial data for the subject.

Continuing with this example, the subject identification module moves at least one side of the initial bounding box outward. To do so, the subject classification module may determine which side of the bounding box is associated with the "bottom" of the facial data for the subject. This may be done based on the location of certain facial landmarks associated with the subject. In the example depicted in FIG. 6, the subject classification module may detect that side 612 is the side of the bounding box 604 that is toward the "bottom" of the facial data. The subject classification module may move side 612 outward from the center 610 until the side 612 encounters either the end of the image height or another subject (or bounding box associated with another subject). As depicted in FIG. 6, the side 612 can be moved downward until the side 612 encounters the bounding box for subject 614.

The subject identification module can also execute one or more computer vision techniques to identify a contour for the subject within the bounding box 604. In some cases, the subject classification module may generate a contour 616 for the subject as a bitmap image including active and inactive pixels (indicated by a "1" or a "0"). For instance, each pixel determined to be within a space that includes the subject is made active (or alternatively inactive) and each pixel determined to be outside of the space that includes the subject is made inactive (or alternatively active). The bitmap generated for a subject's contour in the manner described above may include a simple bitstream, where each bit represents a pixel and a "1" or a "0" is used to indicate whether that pixel is active or inactive.

Figure 7:
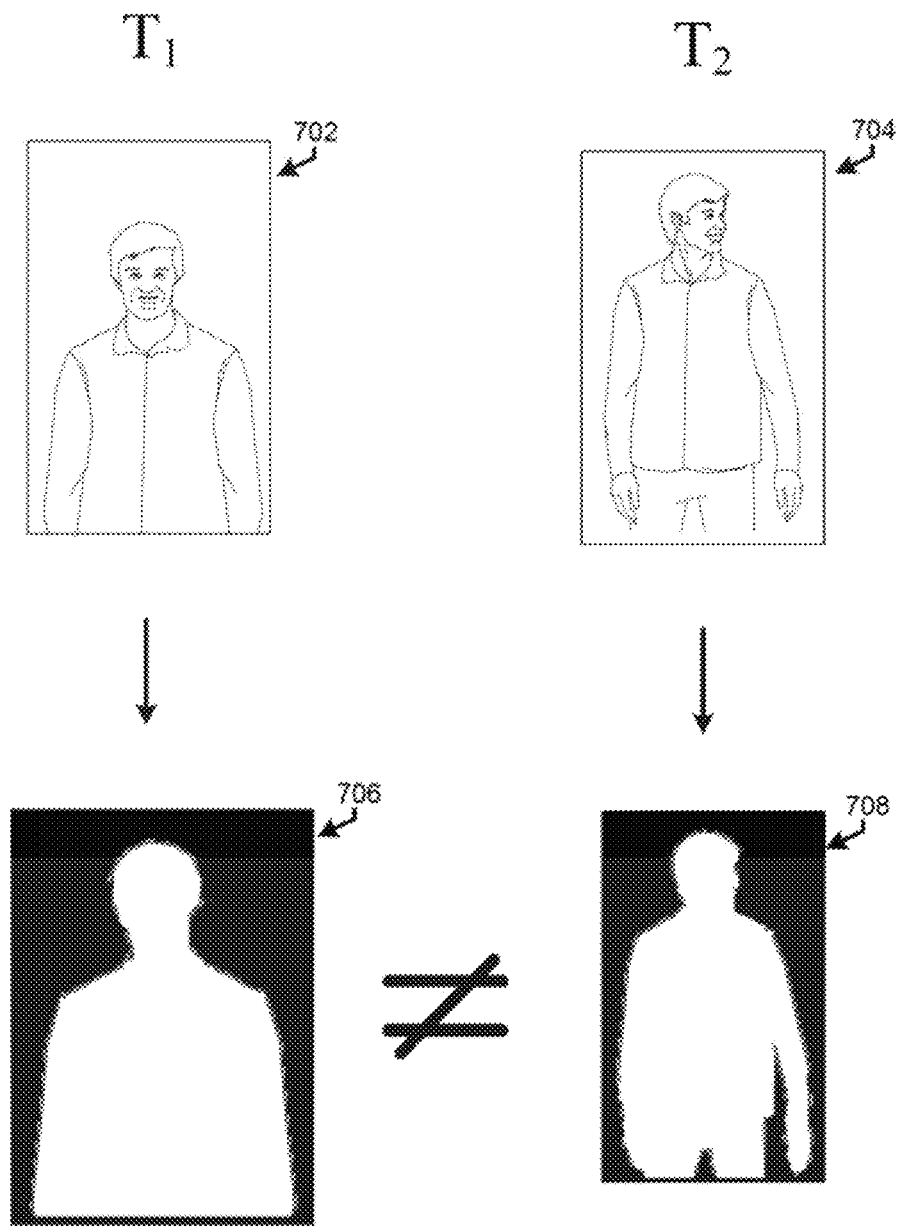
FIG. 7 depicts an illustrative example of using contour data to identify an active subject in accordance with embodiments of the disclosure.

FIG. 7 depicts an illustrative example of using contour data to identify an active subject in accordance with embodiments of the disclosure. In FIG. 7, a subject identification module identifies a subject within image information at times $T_1$ and $T_2$. In particular, the subject is identified at 702 at time $T_1$ and at 704 at time $T_2$. In this example, a contour 706 is generated for the subject from the image information at 702. Additionally, a contour 708 is generated for the subject from the image information at 704. In some embodiments, this may involve one or more operations for generating subject contour data described with respect to FIG. 6 above.

The subject classification module can compare the contours 706 and 708 generated for the subject. In some embodiments, the contours 706 and 708 may include bitmap images having active and inactive pixels. In these embodiments, the contours may be aligned such that corresponding pixels in each of the respective contours 706 and 708 can be matched. The subject classification module may perform a bitwise "exclusive or" (XOR) operation on the two contours 706 and 708. This may involve comparing each bit in contour 706 to its respective bit in contour 708 using an XOR operation. As an XOR operation will return a "0" if two bits match or a "1" if the two bits do not match. The subject classification module may determine a difference between the two contours 706 and 708 based on the number of 1's returned. In some embodiments, an objective difference value may be generated for the two contours as a proportion of the number of 1's returned to the number of bits in at least one of the contours 706 and 708, which would result in a ratio or percentage. But other embodiments could involve other techniques for determining a difference between two contour data.

The subject classification module can compare an objective difference value generated for the two contours 706 and 708 to a threshold value, and can thereby determine whether the subject associated with the two contours 706 and 708 should be classified as an active subject or a passive subject. If the objective difference value is greater than the threshold value, then the subject may be determined to be an active subject. If the objective difference value is not greater than the threshold value, then the subject may be determined to be a passive subject. In the example provided in FIG. 7, the contours 706 and 708 may be determined to be associated with an objective difference value that is greater than the threshold value, indicating that the contours 706 and 708 are not equivalent and that the subject associated with contours 706 and 708 is an active subject.

Figure 8:
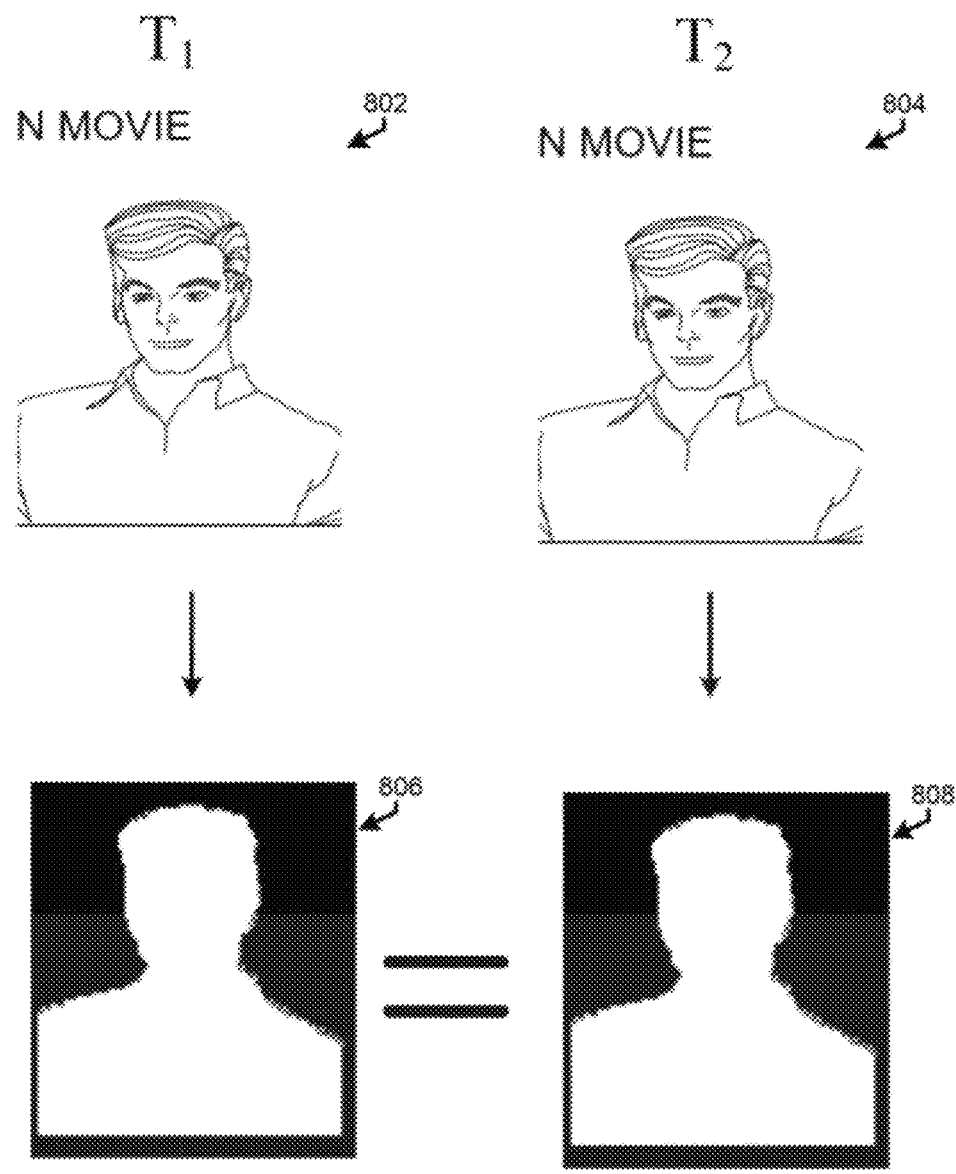
FIG. 8 depicts an illustrative example of using contour data to identify a passive subject in accordance with embodiments of the disclosure.

FIG. 8 depicts an illustrative example of using contour data to identify a passive subject in accordance with embodiments of the disclosure. Similar to FIG. 7 above, in FIG. 8, a subject identification module identifies a subject within image information at times $T_1$ and $T_2$. In particular, the subject is identified at 802 at time $T_1$ and at 804 at time $T_2$. In this example, a contour 806 is generated for the subject from the image information at 802. Additionally, a contour 808 is generated for the subject from the image information at 804. As described elsewhere, this may involve one or more operations for generating subject contour data described with respect to FIG. 6 above.

The subject classification module can compare the contour 806 and the contour 808 to determine an objective difference value in a manner similar to that described with respect to FIG. 7 above. As described above, once an objective difference value has been generated for the two contours 806 and 808, that objective difference value may be compared to a threshold value to determine whether the subject associated with the two contours 806 and 808 should be classified as an active subject or a passive subject. In the example provided in FIG. 8, the contours 806 and 808 may be determined to be associated with an objective difference value that is not greater than the threshold value, indicating that the contours 806 and 808 are essentially equivalent and that the subject associated with contours 806 and 808 is a passive subject.

Figure 9:
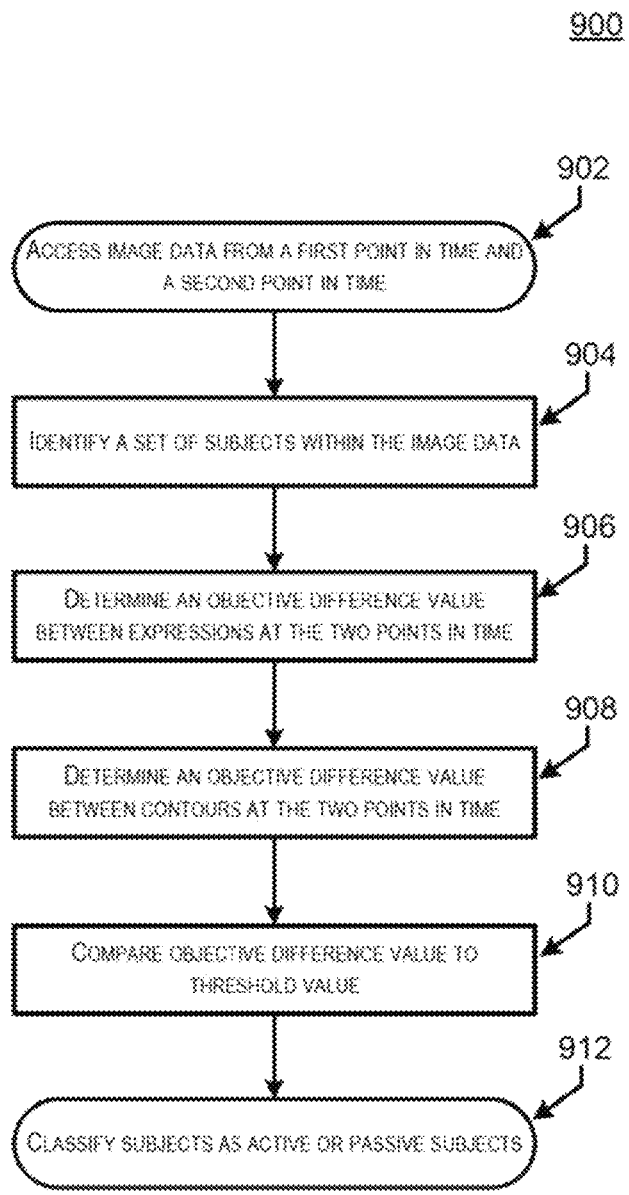
FIG. 9 depicts an illustrative example of a process for identifying passive subjects within an image in accordance with at least some embodiments.

FIG. 9 depicts an example of a process for identifying passive subjects within an image in accordance with at least some embodiments. The process 900 may be performed by an image processing computer, such as the image processing computer 200 described with respect to FIG. 2 above. More particularly, the process 900 may be performed by an image processing application (e.g., image processing application 102 of FIG. 1) that includes a subject classification module.

At block 902, the process 900 involves accessing image data from at least a first point in time and a second point in time. In some embodiments, the image data from the first point in time and the second point in time is obtained via a live capture event. For example, a series of images may be captured within some period of time (e.g., 3 seconds). In some embodiments, the image data from the first point in time and the second point in time are selected from a user's catalog of images based upon the image data from the first point in time and the second point in time both including the set of subjects. For example, a user may maintain a catalog of images associated with his or her account. In this example, the system may identify the same set of subjects within two separate images in the catalog of images.

At block 904, the process 900 involves identifying a set of subjects within the image data. This further involves identifying matching facial features within each of the image data from the first point in time and the image data from the second point in time to identify a common set of subjects within the two image data.

At block 906, the process 900 involves determining an objective difference value between expressions at the two points in time for each subject. In some embodiments, the objective difference value is determined by identifying a first set of facial landmark locations for the subject at the first point in time, identifying a second set of facial landmark locations for the subject at the second point in time, and calculating a difference in a first relationship between the facial landmark locations in the first set of facial landmark locations and a second relationship between the facial landmark locations in the second set of facial landmark locations.

At block 908, the process 900 involves determining an objective difference value between contours at the two points in time for each subject. In some embodiments, the objective difference value is determined by identifying a first contour for the subject at the first point in time, identifying a second contour for the subject at the second point in time, and calculating the objective difference value as a difference between the first contour and the second contour. In at least some of those embodiments, the objective difference value is calculated by performing an exclusive or operation on the first contour and the second contour, and dividing a result of the exclusive or operation by a size of at least one of the first contour or the second contour.

At block 910, the process 900 involves comparing the objective difference value to a threshold value for each subject. In some embodiments, the threshold value is determined based on one or more characteristics of the image data. For example, the one or more characteristics of the image data may be a motion of a camera at the first point in time or second point in time. In this example, the threshold would be higher if the image was captured using a camera that is in motion in order to account for a higher likelihood of error in the facial landmark detection and/or contour detection.

At block 912, the process 900 involves classifying each subject as either an active subject or a passive subject based on the comparison of an objective difference value to the threshold value. For example, if the objective difference value is greater than the threshold value, the subject associated with that objective difference value is determined to be an active subject. Alternatively, if the objective difference value is not greater than the threshold value, the subject associated with that objective difference value is determined to be a passive subject. In some embodiments, the subject is classified as either an active subject or a passive subject automatically, without requiring input provided by a user.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   accessing image data from at least a first point in time and a second point in time, the image data comprising information associated with a set of subjects;
   determining, for each subject in the set of subjects, a respective objective difference value between the first point in time and the second point in time based on one or more of:
   (a) a first facial expression of the subject at the first point in time and a second facial expression of the subject at the second point in time, the first facial expression and the second facial expression determined using a first trained machine learning model, or
   (b) a first outline contour of the subject at the first point in time and a second outline contour of the subject at the second point in time, the first outline contour and the second outline contour determined using a second trained machine learning model;
   comparing, to an objective difference threshold, the respective objective difference value for each subject in the set of subjects; and
   identifying a subset of active subjects from the set of subjects, based on the respective objective difference value of each active subject in the subset of active subjects exceeding the objective difference threshold.

2. The computer-implemented method of claim 1, wherein, for each subject in the set of subjects, the respective objective difference value is determined by:
   identifying, using the first trained machine learning model, a first set of facial landmark locations for the subject at the first point in time;
   identifying, using the first trained machine learning model, a second set of facial landmark locations for the subject at the second point in time; and calculating a difference in a first relationship between the facial landmark locations in the first set of facial landmark locations and a second relationship between the facial landmark locations in the second set of facial landmark locations.

3. The computer-implemented method of claim 1, wherein, for each subject in the set of subjects, the respective objective difference value is determined by:
   identifying, using the second trained machine learning model, the first outline contour for the subject at the first point in time;
   identifying, using the second trained machine learning model, the second outline contour for the subject at the second point in time; and
   calculating a difference between the first outline contour and the second outline contour.

4. The computer-implemented method of claim 3, wherein, for each subject in the set of subjects, the respective objective difference value is calculated by:
   performing an exclusive-or ("XOR") operation on the first outline contour for the subject and the second outline contour for the subject; and
   dividing a result of the XOR operation by a size of at least one of the first outline contour or the second outline contour.

5. The computer-implemented method of claim 1, wherein, for each subject in the set of subjects, determining the respective objective difference value between (a) the first facial expression of the subject at the first point in time and (b) the second facial expression of the subject at the second point in time comprises:
   determining a particular objective difference value between (a) the first facial expression of the subject at the first point in time and (b) the second facial expression of the subject at the second point in time; and
   based on determining that the particular objective difference value is not greater than an additional threshold value, determining an additional objective difference value between (a) the first outline contour of the subject at the first point in time and (b) the second outline contour of the subject at the second point in time.

6. A system comprising:
   a processor; and
   a memory including instructions that, if executed with the processor, cause the system to, at least:
      access image data from at least a first point in time and a second point in time, the image data comprising information associated with a set of subjects;
      determine, for each subject in the set of subjects, a respective objective difference value between the first point in time and the second point in time based on one or more of:
         (a) a first facial expression of the subject at the first point in time and a second facial expression of the subject at the second point in time, the first facial expression and the second facial expression determined using a first trained machine learning model, or
         (b) a first outline contour of the subject at the first point in time and a second outline contour of the subject at the second point in time, the first outline contour and the second outline contour determined using a second trained machine learning model;
      compare, to an objective difference threshold, the respective objective difference value for each subject in the set of subjects; and
      identify a subset of active subjects from the set of subjects, based on the respective objective difference value of each active subject in the subset of active subjects exceeding the objective difference threshold.

7. The system of claim 6, wherein, for each subject in the set of subjects, determining the respective objective difference value comprises:
   determining, using the first trained machine learning model, a first number of relationships between locations of facial landmarks for the subject at the first point in time;
   determining, using the first trained machine learning model, a second number of relationships between locations of facial landmarks for the subject at the second point in time; and
   determining the respective objective difference value as a difference between the first number of relationships and the second number of relationships.

8. The system of claim 6, wherein, for each subject in the set of subjects, determining the respective objective difference value comprises:
   determining, using the second trained machine learning model, the first outline contour for the subject at the first point in time;
   determining, using the second trained machine learning model, the second outline contour for the subject at the second point in time; and
   determining a difference between the first outline contour and the second outline contour.

9. The system of claim 6, wherein determining a particular outline contour for a particular subject in the set of subjects comprises:
   generating a bounding box at a location of the particular subject;
   identifying pixels within the bounding box that depict the particular subject; and
   creating the particular outline contour for the particular subject that includes the identified pixels.

10. The system of claim 9, wherein the bounding box is generated to have a width or height proportional to an additional width or height associated with facial features associated with the particular subject.

11. The system of claim 9, wherein generating the bounding box comprises:
    placing an initial bounding box; and
    moving at least one side of the initial bounding box outward from a center of the initial bounding box to form the bounding box.

12. The system of claim 11, wherein the at least one side of the initial bounding box is moved outward from the center of the initial bounding box until it encounters either an edge of the image data or another subject.

13. The system of claim 6, wherein comparing the objective difference threshold to the respective objective difference value further comprises:
    comparing the objective difference threshold to an additional respective objective difference value for each additional subject in the set of subjects; and
    determining that at least one of the additional subjects having the additional respective objective difference value that does not exceed the objective difference threshold is a passive subject.

14. A non-transitory computer-readable medium storing specific computer-executable instructions that, if executed by a processor, cause a computer system to at least:

access image data from at least a first point in time and a second point in time, the image data comprising information associated with a set of subjects;

determine, for each subject in the set of subjects, a respective objective difference value between the first point in time and the second point in time based on one or more of:

(a) a first facial expression of the subject at the first point in time and a second facial expression of the subject at the second point in time, the first facial expression and the second facial expression determined using a first trained machine learning model, or (b) a first outline contour of the subject at the first point in time and a second outline contour of the subject at the second point in time, the first outline contour and the second outline contour determined using a second trained machine learning model;

compare, to an objective difference threshold, the respective objective difference value for each subject in the set of subjects; and identify a subset of active subjects from the set of subjects, based on the respective objective difference value of each active subject in the subset of active subjects exceeding the objective difference threshold.

15. The computer-readable medium of claim 14, wherein, for each subject in the set of subjects, the respective objective difference value is determined by:

identifying, using the first trained machine learning model, a first set of facial landmark locations for the subject at the first point in time;

identifying, using the first trained machine learning model, a second set of facial landmark locations for the subject at the second point in time; and calculating a difference in a first relationship between the facial landmark locations in the first set of facial landmark locations and a second relationship between the facial landmark locations in the second set of facial landmark locations.

16. The computer-readable medium of claim 14, wherein, for each subject in the set of subjects, the respective objective difference value is determined by:

identifying, using the second trained machine learning model, the first outline contour for the subject at the first point in time;

identifying, using the second trained machine learning model, the second outline contour for the subject at the second point in time; and calculating a difference between the first outline contour and the second outline contour.

17. The computer-readable medium of claim 14, wherein the image data from the first point in time and the second point in time are included within a live capture event.

18. The computer-readable medium of claim 14, wherein the image data from the first point in time and the second point in time are selected from a user's catalog of images based upon the image data from the first point in time and the second point in time both including the set of subjects.

19. The computer-readable medium of claim 14, wherein a value of the objective difference threshold is determined based on one or more characteristics of the image data.

20. The computer-readable medium of claim 19, wherein the one or more characteristics of the image data comprises a motion of a camera at the first point in time or the second point in time.

* * * * *